United States Patent
Ono

(10) Patent No.: US 10,165,181 B2
(45) Date of Patent: Dec. 25, 2018

(54) IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 341 days.

(21) Appl. No.: 15/015,650

(22) Filed: Feb. 4, 2016

(65) Prior Publication Data

US 2016/0227112 A1 Aug. 4, 2016

Related U.S. Application Data

(63) Continuation of application No. PCT/JP2014/070179, filed on Jul. 31, 2014.

(30) Foreign Application Priority Data

Aug. 27, 2013 (JP) .................................. 2013-175718

(51) Int. Cl.
   *G02B 21/00* (2006.01)
   *H04N 5/232* (2006.01)
   *G03B 15/00* (2006.01)
   *G02B 13/00* (2006.01)
   (Continued)

(52) U.S. Cl.
   CPC ....... *H04N 5/23238* (2013.01); *G02B 13/009* (2013.01); *G02B 13/0065* (2013.01);
   (Continued)

(58) Field of Classification Search
   CPC ............ G02B 27/1066; G02B 17/0896; G02B 13/0065; G02B 17/0808; G02B 13/009;
   (Continued)

(56) References Cited

U.S. PATENT DOCUMENTS 4,950,056 A 8/1990 Smith
6,341,044 B1 1/2002 Driscoll, Jr. et al.
(Continued)

FOREIGN PATENT DOCUMENTS

EP 1377037 A1 1/2004
JP 2012-105059 A 5/2012
(Continued)

OTHER PUBLICATIONS

The extended European search report issued by the European Patent Office dated Aug. 26, 2016, which corresponds to European Patent Application No. 14839265.7-1562 and is related to U.S. Appl. No. 15/015,650.

(Continued)

*Primary Examiner* — Sathyanaraya V Perungavoor
*Assistant Examiner* — Howard D Brown, Jr.
(74) *Attorney, Agent, or Firm* — Studebaker & Brackett PC

(57) ABSTRACT

The present invention provides an imaging device capable of greatly reducing the assignment number of light reception cells assigned to each microlens of an array lens and increasing the number of pixels of images having different characteristics that are captured simultaneously. One aspect of the present invention is an imaging device that includes an imaging optical system including a center optical system (wide-angle lens) and an annular optical system (telescopic lens) that share an optical axis, an image sensor, and an array lens arranged on the incidence side of the image sensor and including microlenses (pupil imaging lenses). The array lens causes annular pupil images corresponding to the annular optical system adjacent to each other among a center pupil image and annular pupil images formed on the image sensor by the respective microlenses to partially overlap each other on the image sensor.

15 Claims, 15 Drawing Sheets

(51) Int. Cl.
*G02B 17/08* (2006.01)
*H04N 5/225* (2006.01)
*G03B 17/02* (2006.01)
*H04N 5/378* (2011.01)
*H04N 9/04* (2006.01)
*G02B 27/10* (2006.01)
*G02B 27/12* (2006.01)
*G02B 3/00* (2006.01)

(52) U.S. Cl.
CPC ..... *G02B 17/0808* (2013.01); *G02B 17/0896* (2013.01); *G02B 27/1066* (2013.01); *G02B 27/123* (2013.01); *G03B 15/00* (2013.01); *G03B 17/02* (2013.01); *H04N 5/2254* (2013.01); *H04N 5/2259* (2013.01); *H04N 5/378* (2013.01); *H04N 9/045* (2013.01); *G02B 3/0056* (2013.01)

(58) Field of Classification Search
CPC ...... G02B 3/0056; H04N 9/045; H04N 5/378; H04N 5/2259; H04N 5/2254; G03B 17/02; G03B 15/00
See application file for complete search history.

(56) References Cited

U.S. PATENT DOCUMENTS

| | | | |
|---|---|---|---|
| 8,345,144 B1* | 1/2013 | Georgiev | G03B 11/00 348/335 |
| 8,471,920 B2* | 6/2013 | Georgiev | G03B 11/00 348/221.1 |
| 2010/0188856 A1 | 7/2010 | Ford et al. | |
| 2013/0329042 A1* | 12/2013 | Murata | G03B 13/36 348/140 |
| 2014/0091205 A1 | 4/2014 | Takamiya | |
| 2014/0168498 A1 | 6/2014 | Ono | |
| 2015/0192758 A1* | 7/2015 | Yamagata | G02B 5/3025 348/360 |
| 2015/0338606 A1* | 11/2015 | Ono | H04N 5/2259 348/322 |
| 2016/0241797 A1* | 8/2016 | Ye | G02B 27/2214 |
| 2016/0323504 A1* | 11/2016 | Ono | H04N 5/2259 |
| 2017/0104929 A1* | 4/2017 | Ono | G02B 13/00 |

FOREIGN PATENT DOCUMENTS

| | | |
|---|---|---|
| JP | 2012-244243 A | 12/2012 |
| JP | 2012-247645 A | 12/2012 |
| JP | 2012-253670 A | 12/2012 |
| JP | 2013-004635 A | 1/2013 |
| WO | 2013/027488 A1 | 2/2013 |

OTHER PUBLICATIONS

Written Opinion of PCT/JP2014/070179 dated Nov. 4, 2014.
International Search Report of PCT/JP2014/070179 dated Nov. 4, 2014.

* cited by examiner

FIG. 6
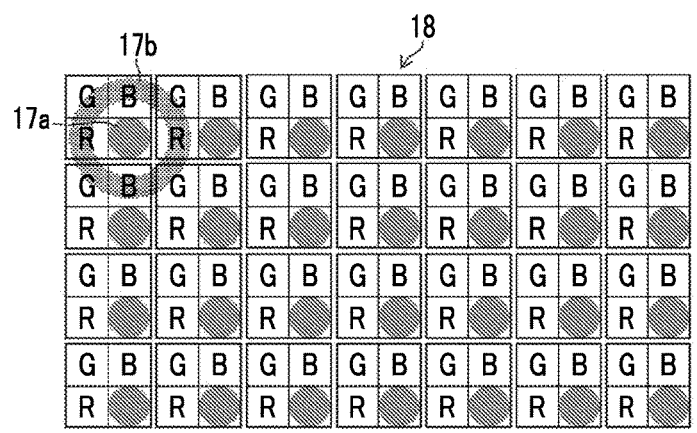
FIG. 7A
FIG. 7C
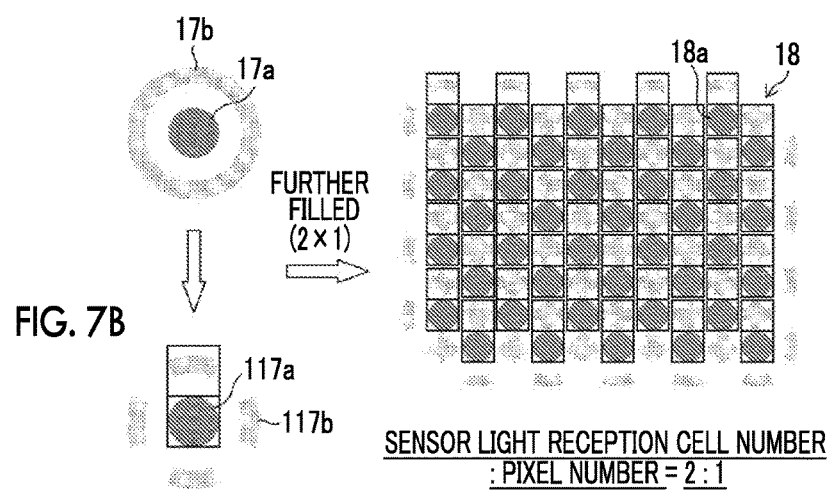
FIG. 7B
SENSOR LIGHT RECEPTION CELL NUMBER
: PIXEL NUMBER = 2 : 1

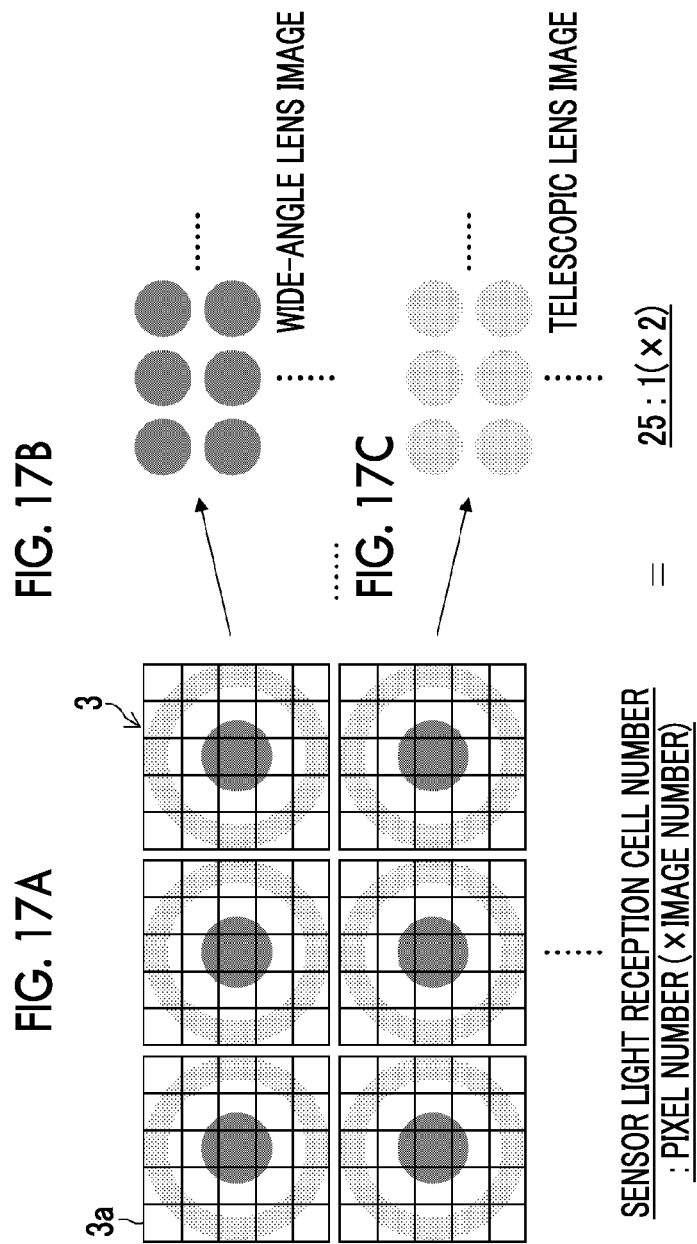

SENSOR LIGHT RECEPTION CELL NUMBER : PIXEL NUMBER = 25 : 1

FURTHER FILLED TO 3×3

SENSOR LIGHT RECEPTION CELL NUMBER : PIXEL NUMBER = 9 : 1

IMAGING DEVICE

CROSS-REFERENCE TO RELATED APPLICATIONS

This application is a Continuation of PCT International Application No. PCT/JP2014/070179 filed on Jul. 31, 2014, which claims priority under 35 U.S.C. § 119(a) to Japanese Patent Application No. 2013-175718 filed on Aug. 27, 2013. Each of the above applications is hereby expressly incorporated by reference, in their entirety, into the present application.

BACKGROUND OF THE INVENTION

1. Field of the Invention

The present invention relates to an imaging device, and particularly, to an imaging device capable of simultaneously capturing a plurality of images having different characteristics.

2. Description of the Related Art

Conventionally, an imaging device that includes an imaging optical system 1 including a central optical system (a wide-angle lens) 1a in a central portion and an annular optical system (telescopic lens) 1b in a surrounding portion of the central optical system having different characteristics from the central optical system 1a, which are arranged on the same optical axis, an image sensor 3, and an array lens 2 including a plurality of microlenses (pupil imaging lens) arranged on the incidence surface side of the image sensor 3, which forms a pupil image of the imaging optical system on the image sensor 3 using each microlens, as illustrated in FIG. 15, has been proposed (JP2012-253670A).

In the imaging optical system 1 including the central optical system 1a and the annular optical system 1b, an image plane of the imaging optical system 1 is located on the array lens 2, and the array lens 2 forms a pupil image of the imaging optical system 1 on the image sensor 3.

FIG. 16 illustrates one light reception cell 3a on the image sensor 3, and the pupil image of the imaging optical system 1 that one microlens of the array lens 2 forms on the image sensor 3. This pupil image includes a central pupil image (wide-angle lens component) corresponding to the central optical system 1a, and an annular pupil image (telescopic lens component) corresponding to the annular optical system 1b.

FIG. 17A shows an example in which 5×5 light reception cells 3a of the image sensor 3 are assigned per microlens.

As illustrated in FIG. 17A, in every group of 5×5 (=25) light reception cells, a central pupil image (wide-angle lens component) is received by the light reception cell in the central portion, and an annular pupil image (telescopic lens component) is received by the light reception cells in the surrounding portion.

In every group of 25 light reception cells, an image signal of one pixel of a wide-angle image is generated from the light reception cell receiving a wide-angle lens component and, similarly, an image signal of one pixel of a telescopic image is generated from the light reception cell receiving a telescopic lens component. Accordingly, a wide-angle image corresponding to the wide-angle lens and a telescopic image corresponding to the telescopic lens are obtained, as illustrated in FIGS. 17B and 17C.

In the example illustrated in FIGS. 17A to 17C, a relationship between the number of light reception cells of the image sensor 3 and the number of pixels of the wide-angle image and the telescopic image obtained from the image sensor 3 is light reception cell number:pixel number (×image number)=25:1 (×2).

SUMMARY OF THE INVENTION

When the 5×5 light reception cells 3a of the image sensor 3 are assigned to each microlens as illustrated in FIGS. 17A to 17C, there is a problem in that the number of pixels of images (a wide-angle image and a telescopic image in the above example) having different characteristics obtained from the image sensor 3 is greatly decreased as compared to the number of pixels the image sensor 3.

A simplest method of suppressing a decrease in the number of pixels of the images having different characteristics obtained from the image sensor 3 is to reduce the number (assignment number) of light reception cells assigned to each microlens. It is possible to increase the number of pixels of images having different characteristics that can be taken out, by an amount corresponding to reduction of the assignment number.

However, the imaging optical system 1 including the central optical system 1a in a central portion and the annular optical system 1b (concentrically divided imaging optical system) has more excellent lens performance than, for example, a vertically divided imaging optical system in which the imaging optical system is vertically divided into two optical systems having different characteristics, but there is a problem in that the number of pixels of the image which can be taken out cannot be sufficiently increased.

FIGS. 18A and 18B illustrate an example in which 5×5 light reception cells 3a of the image sensor 3 are assigned to each microlens, and an example in which 3×3 light reception cells 3a are assigned, respectively.

That is, when the imaging optical system is concentrically divided, the assignment number of the reception cells that can be assigned to each microlens of the array lens is limited to 3×3. In this case, a relationship between the number of light reception cells of the image sensor 3 and the number of pixels of a wide-angle image or a telescopic image obtained from the image sensor 3 is light reception cell number:pixel number=9:1.

The present invention has been made in view of such circumstances, and an object of the present invention is to provide an imaging device capable of greatly reducing the assignment number of light reception cells assigned to each microlens of an array lens and increasing the number of pixels of images having different characteristics that are captured simultaneously.

In order to achieve the above object, an imaging device according to one aspect of the present invention includes an imaging optical system including a first optical system, and a second optical system provided around the first optical system and having different characteristics from the first optical system; an image sensor including a plurality of two-dimensionally arranged light reception elements; and an array lens including a two-dimensionally arranged microlenses, the array lens being arranged on the incidence surface side of the image sensor and forming pupil images of the imaging optical system on the image sensor using the respective microlens, wherein the array lens causes second pupil images corresponding to the second optical systems adjacent to each other among the respective pupil images formed on the image sensor by the respective microlenses to partially overlap each other on the image sensor.

When the assignment number of light reception cells of the image sensor assigned to each microlens of the array lens is less than 3×3, the pupil images of the adjacent microlens begin to overlap each other (crosstalk occurs). In general, a ray space (light field) cannot be taken out from the pixel in which the crosstalk occurs, and when pixels are taken out pixel by pixel from the pupil image to reconstruct an image, a correct image cannot be generated.

However, in the case of the present invention, since an image corresponding to the first optical system and an image corresponding to the second optical system may be able to be captured, at least the pupil image corresponding to the first optical system and the pupil image corresponding to the second optical system may not overlap each other. That is, even when the second pupil images corresponding to the second optical systems adjacent to each other partially overlap each other on the image sensor, images near the pupil images created by the second optical systems merely overlap and there is some change in characteristics, but the images do not collapse.

Thus, since the array lens causes the second pupil images corresponding to the second optical systems adjacent to each other to partially overlap each other on the image sensor, it is possible to reduce the assignment number of the light reception cells of the image sensor substantially assigned to each microlens of the array lens to be smaller than 3×3. As a result, it is possible to increase the number of pixels of the images having different characteristics that can be captured simultaneously.

It is preferable that the imaging device according to another aspect of the present invention includes: an image generation unit that reads a first pupil image corresponding to the first optical system and a second pupil image corresponding to the second optical system from the image sensor, and generates a first image including the first pupil image and a second image including the second pupil image. From each of one first pupil image and one second pupil image, one pixel in each of pixel groups constituting the first image and the second image is created. Further, the second pupil image corresponds to at least two or more pixels on the image sensor, but the pixels are appropriately summed to be one pixel.

In the imaging device according to still another aspect of the present invention, it is preferable that the first optical system of the imaging optical system is a circular central optical system, and the second optical system is an annular optical system arranged concentrically with respect to the central optical system, and the array lens causes the annular pupil images corresponding to the annular optical system adjacent to each other among the respective pupil images formed on the image sensor by the respective microlenses to partially overlap each other on the image sensor.

Since the first optical system is a circular central optical system and the second optical system is an annular optical system arranged concentrically with respect to the central optical system, each of the first optical system and the second optical system has a point-symmetrical shape with respect to an optical axis of the imaging optical system. Accordingly, although the imaging optical system is divided, excellent optical performance can be obtained.

In the imaging device according to still another aspect of the present invention, the respective pupil images formed on the image sensor by the respective microlenses of the array lens have an image size of 3×3 pixels, a central pupil image corresponding to the central optical system is incident on the light reception element corresponding to a center pixel among the 3×3 pixels, an annular pupil image corresponding to the annular optical system is incident on the light reception elements corresponding to eight pixels around the center pixel among the 3×3 pixels, and when the number of pixels in the image sensor is M and each of the numbers of pixels of a first image including the central pupil image and a second image including the annular pupil image is N, a ratio of the pixel number M and the pixel number N is M:N=4:1. That is, the substantial assignment number of pixels on the image sensor per microlens of the array lens can be four. It is possible to greatly reduce the assignment number as compared to nine that is a minimum assignment number considered when the imaging optical system is concentrically divided and adjacent pupil images do not overlap each other.

In the imaging device according to still another aspect of the present invention, it is preferable that the first optical system of the imaging optical system is a circular central optical system, and the second optical system is an annular optical system arranged concentrically with respect to the central optical system, the array lens causes the annular pupil images corresponding to the annular optical system adjacent to each other among the respective pupil images formed on the image sensor by the respective microlenses to partially overlap each other on the image sensor, and causes the central pupil image corresponding to the central optical system and a portion of the annular pupil image corresponding to the annular optical system that are adjacent to each other to overlap each other, and the annular optical system is formed such that a part corresponding to a portion of the annular pupil image overlapping the central pupil image corresponding to the central optical system is shielded or a part corresponding to a portion of the annular pupil image overlapping the central pupil image corresponding to the central optical system lacks.

According to still another aspect of the present invention, the annular optical system is formed to be partially shielded or partially lacked such that the central pupil image and the annular pupil image do not overlap on the image sensor. Accordingly, it is possible to further reduce the substantial assignment number of pixels on the image sensor per microlens of the array lens.

In the imaging device according to still another aspect of the present invention, the respective pupil images formed on the image sensor by the respective microlenses of the array lens have an image size of 3×3 pixels, a central pupil image corresponding to the central optical system is incident on the light reception element corresponding to a center pixel among the 3×3 pixels, and an annular pupil image corresponding to the annular optical system is incident on the light reception elements corresponding to eight pixels around the center pixel among the 3×3 pixels, and when the number of pixels in the image sensor is M and each of the numbers of pixels of a first image including the central pupil image and a second image including the annular pupil image is N, a ratio of the pixel number M and the pixel number N is M:N=2:1. That is, the substantial assignment number of pixels on the image sensor per microlens of the array lens can be two.

In the imaging device according to still another aspect of the present invention, it is preferable that one of the first optical system and the second optical system in the imaging optical system is a wide-angle optical system, and the other is a telescopic optical system. Accordingly, it possible to simultaneously acquire the wide-angle image and the telescopic image through one imaging.

In the imaging device according to still another aspect of the present invention, it is preferable that the first optical system of the imaging optical system is a circular central optical system, the second optical system is an annular optical system arranged concentrically with respect to the central optical system, and the central optical system has a wider angle than the annular optical system.

In the imaging device according to still another aspect of the present invention, it is preferable that the first optical system of the imaging optical system is a circular central optical system, the second optical system is an annular optical system arranged concentrically with respect to the central optical system, a third optical system and a fourth optical system having different characteristics being alternately arranged, and the array lens causes first annular pupil images corresponding to the third optical systems of the annular optical system adjacent to each other among the respective pupil images formed on the image sensor by the respective microlenses to overlap each other on the image sensor, and causes second annular pupil images corresponding to the fourth optical systems of the annular optical system that are adjacent to each other to overlap each other on the image sensor.

According to still another aspect of the present invention, it is possible to constitute the imaging optical system using three types of optical systems (first, third, and fourth optical systems) having different characteristics, to simultaneously acquire three types of images having different characteristics through one imaging, and to further reduce the substantial assignment number of pixels on the image sensor per microlens of the array lens.

In the imaging device according to still another aspect of the present invention, the plurality of light reception elements in the image sensor are arranged in a hexagonal lattice form, the respective pupil images formed on the image sensor by the respective microlenses of the array lens have an image size of seven pixels including a central pixel and six pixels around the central pixel, a central pupil image corresponding to the central optical system is incident on the light reception element corresponding to the center pixel among the seven pixels, a first annular pupil image corresponding to a third optical system of the annular optical system is incident on the light reception elements corresponding to three pixels in three directions at 120° from the central pixel among the six pixels around the central pixel, and a second annular pupil image corresponding to a fourth optical system of the annular optical system is incident on the light reception elements corresponding to three other pixels in three directions at 120° from the central pixel among the six pixels around the central pixel, and when the number of pixels in the image sensor is M and each of the numbers of pixels of a first image including the central pupil image, a second image including the first annular pupil image, and a third image including the second annular pupil image is N, a ratio of the pixel number M and the pixel number N is M:N=3:1. That is, the substantial assignment number of pixels on the image sensor per microlens of the array lens can be three.

In the imaging device according to still another aspect of the present invention, it is preferable that the central optical system of the imaging optical system is a wide-angle optical system, and the third optical system and the fourth optical system of the annular optical system are telescopic optical systems having different focal lengths. Accordingly, it is possible to simultaneously acquire a wide-angle image and two telescopic images having different imaging magnifications through one imaging.

In the imaging device according to still another aspect of the present invention, it is preferable that the central optical system of the imaging optical system is a wide-angle optical system, and the third optical system and the fourth optical system of the annular optical system are telescopic optical systems having different imaging distances. Accordingly, it is possible to simultaneously acquire a wide-angle image and two telescopic images focused on subjects having different imaging distances through one imaging.

In the imaging device according to still another aspect of the present invention, it is preferable that the annular optical system includes a reflective optical system that reflects a light beam twice or more. Accordingly, it is possible to shorten a dimension in an optical axis direction of the annular optical system and to make the device compact.

In the imaging device according to still another aspect of the present invention, it is preferable that the image sensor is located on the object side relative to the reflective optical system that initially reflects a light beam. Accordingly, it is possible to arrange the image sensor on an inner side the imaging optical system, and to shorten a dimension in an optical axis direction of the device.

In the imaging device according to still another aspect of the present invention, it is preferable that the central optical system and the annular optical system use a portion of the optical system in common. Accordingly, it is possible to make the device compact and to reduce cost.

According to the present invention, in the imaging optical system including the first optical system and the second optical system in a surrounding portion of the first optical system, since the array lens causes the second pupil images corresponding to the second optical systems adjacent to each other to partially overlap each other on the image sensor, it is possible to reduce the assignment number of the light reception cells of the image sensor substantially assigned to each microlens of the array lens. As a result, it is possible to increase the number of pixels of the images having different characteristics that can be captured simultaneously.

BRIEF DESCRIPTION OF THE DRAWINGS

FIG. 6 is a view illustrating an array of color filters of red (R), green (G), and blue (B) on each light reception cell of the image sensor.

FIGS. 7A to 7C are views used to describe a second embodiment of an imaging device according to the present invention.

FIGS. 17A to 17C are diagrams illustrating an example of each pupil image formed on a conventional image sensor.

DESCRIPTION OF THE PREFERRED EMBODIMENTS

Hereinafter, embodiments of an imaging device according to the present invention will be described with reference to the accompanying drawings.

<Appearance of Imaging Device>

Figure 1:
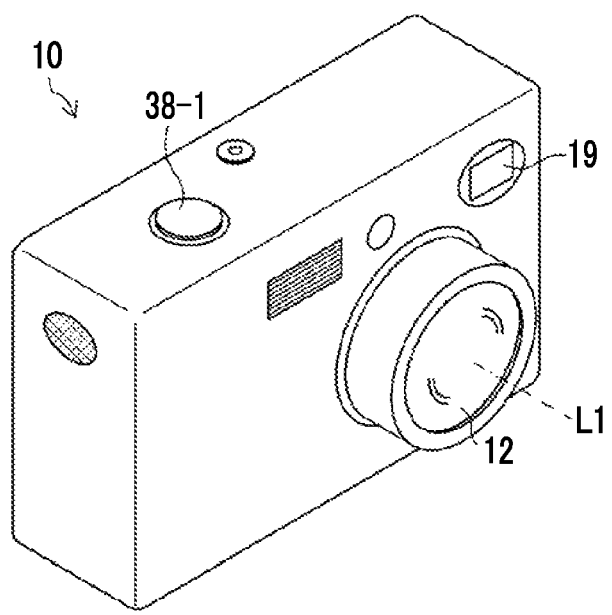
FIG. 1 is a perspective view of an appearance of an imaging device according to the present invention.

FIG. 1 is an external perspective view of an imaging device according to the present invention. As illustrated in FIG. 1, an imaging optical system 12, a flash light emitting unit 19, and the like are arranged on the front surface of the imaging device 10, and a shutter button 38-1 is provided on a top surface. L1 indicates an optical axis of the imaging optical system 12.

Figure 2:
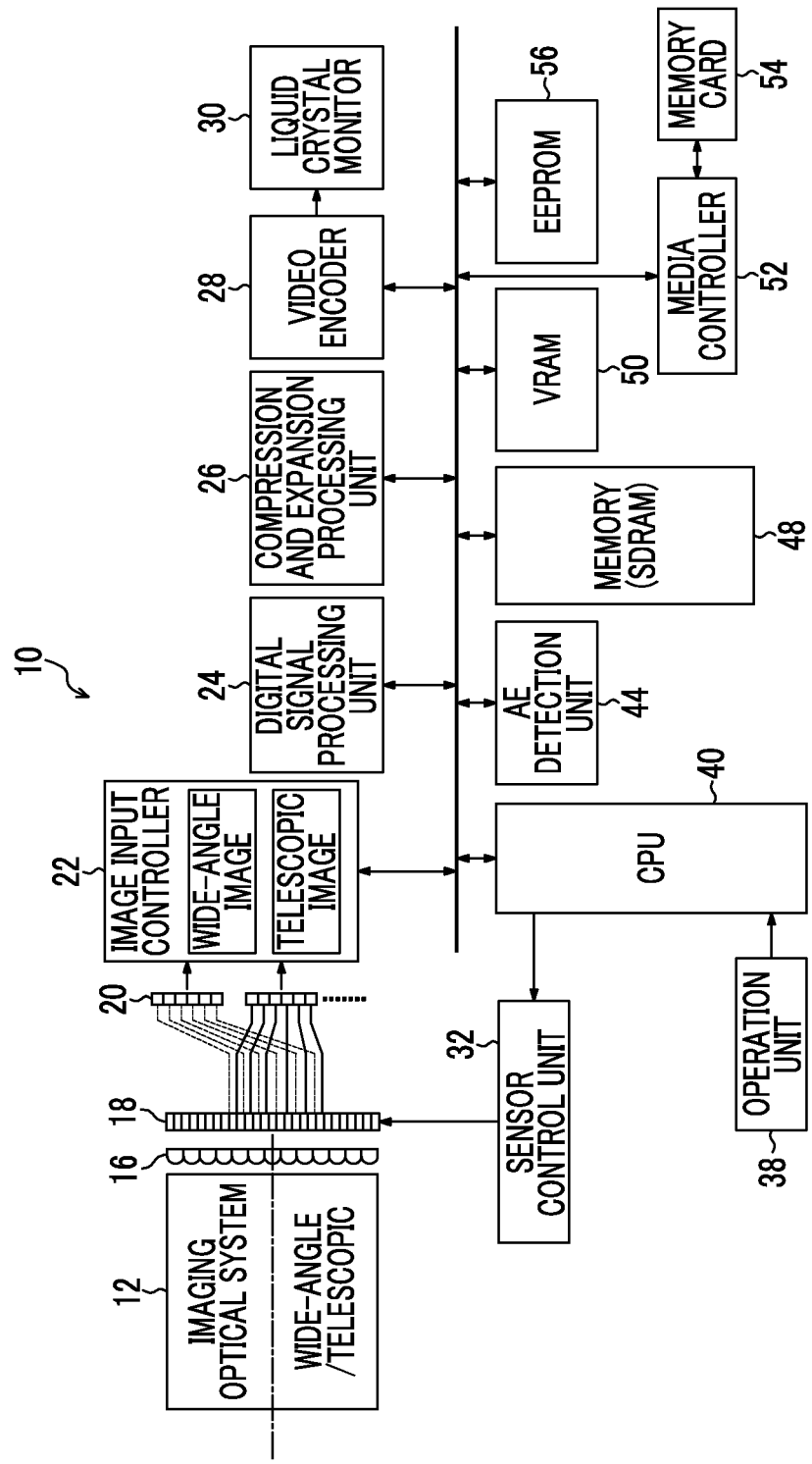
FIG. 2 is a block diagram illustrating an embodiment of an internal configuration of the imaging device illustrated in FIG. 1.

FIG. 2 is a block diagram illustrating an embodiment of an internal configuration of the imaging device 10.

This imaging device 10 records a captured image on a memory card 54, and is mainly characterized by the imaging optical system 12, an array lens 16, and an image sensor 18.

[Imaging Optical System]

Figure 3:
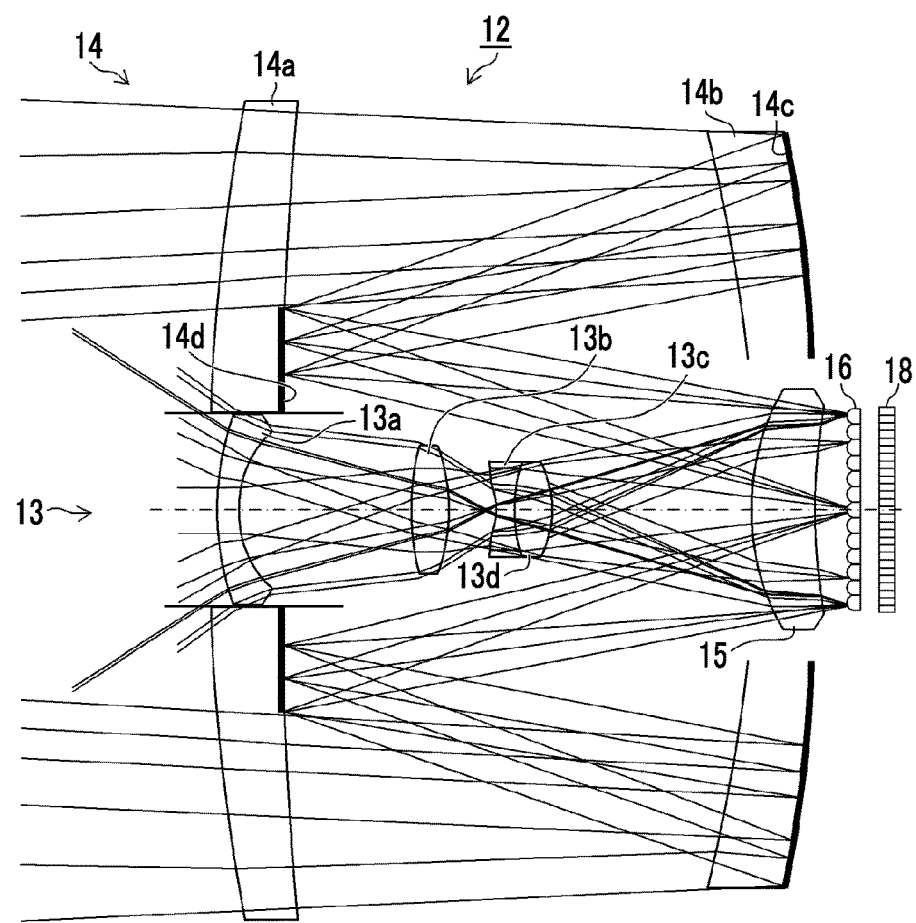
FIG. 3 is a sectional view illustrating a first embodiment of an imaging optical system used in the imaging device illustrated in FIG. 1.

FIG. 3 is a sectional view illustrating a first embodiment of the imaging optical system applied to the imaging device 10.

As illustrated in FIG. 3, the imaging optical system 12 includes a central optical system (first optical system) 13 in a central portion and an annular optical system (second optical system) 14 in a surrounding portion which are arranged on the same optical axis.

The central optical system 13 is a wide-angle optical system (wide-angle lens) including a first lens 13a, a second lens 13b, a third lens 13c, a fourth lens 13d, and a common lens 15, and forms a wide-angle image on the array lens 16.

The annular optical system 14 is a telescopic optical system (telescopic lens) including a first lens 14a, a second lens 14b, a first reflective mirror 14c (reflective optical system), a second reflective mirror 14d (reflective optical system), and a common lens 15, and forms a telescopic image on the array lens 16. A light beam incident through the first lens 14a and the second lens 14b is reflected twice by the first reflective mirror 14c and the second reflective mirror 14d, and passes through the common lens 15. By the light beam being folded back by the first reflective mirror 14c and the second reflective mirror 14d, a length in an optical axis direction of the telescopic optical system (telescopic lens) having a great focal length is shortened.

First Embodiment of Imaging Device According to the Present Invention

Next, a first embodiment of an imaging device according to the present invention will be described.

Figure 4:
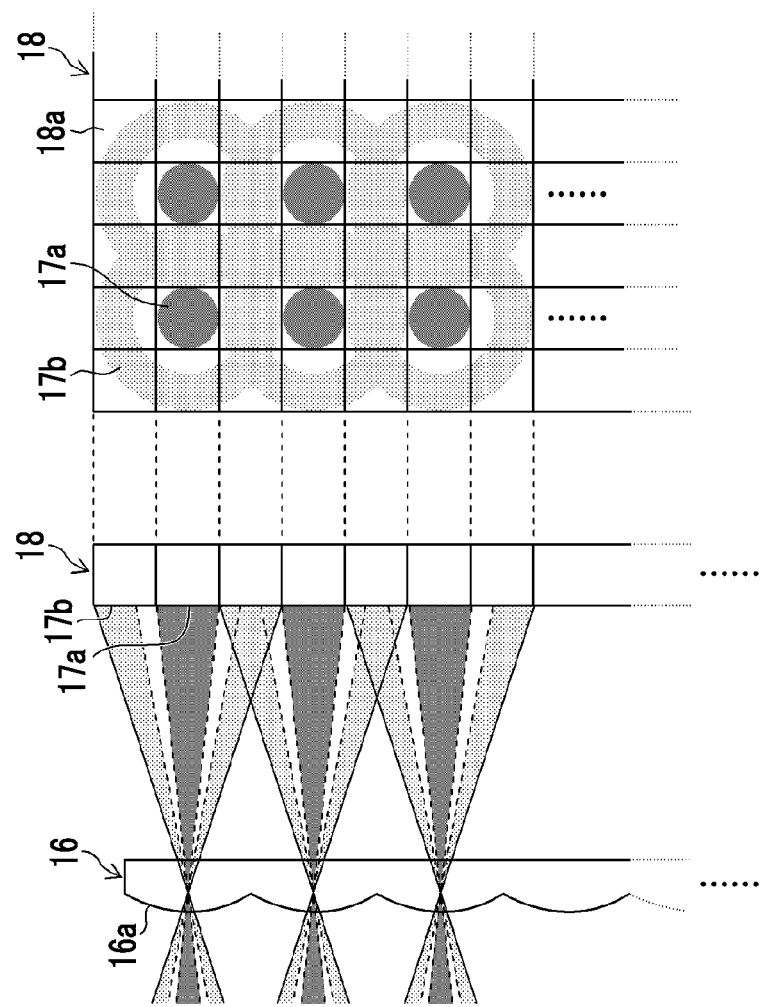
FIG. 4 is an enlarged view of primary portions of an array lens and an image sensor used to describe a first embodiment of the imaging device according to the present invention

FIG. 4 is an enlarged view of primary portions of the array lens 16 and the image sensor 18 illustrated in FIGS. 2 and 3.

The array lens 16 is configured by arranging a plurality of microlenses (pupil imaging lenses) 16a in a two-dimensional form, and spacings in horizontal and vertical directions between the respective microlenses correspond to a spacing of two light reception cells 18a of the image sensor 18. That is, each microlens of the array lens 16 formed to correspond to the position of every other light reception cell in each of the horizontal and vertical directions is used.

Further, each microlens 16a of the array lens 16 forms a circular central pupil image (first pupil image) 17a and an annular pupil image (second the pupil image) 17b corresponding to the central optical system 13 and the annular optical system 14 of the imaging optical system 12 on the image sensor 18.

Here, the annular pupil images 17b adjacent to each other partially overlap on the image sensor 18. That is, the array lens 16 is arranged at an appropriate position on the incidence side of the image sensor 18, and is configured such that the annular pupil images 17b adjacent to each other among the central pupil image 17a and the annular pupil image 17b formed on the image sensor 18 by the respective microlenses 16a partially overlap on the image sensor 18.

According to the array lens 16 and the image sensor 18 of the first embodiment illustrated in FIG. 4, the central pupil image 17a is formed on only one (a center pixel among 3×3 pixels) of the light reception cells 18a on the image sensor 18, and the annular pupil image 17b is formed on the eight light reception cells 18a around the light reception cell 18a on which the central pupil image 17a is formed. The annular pupil image 17b formed on the eight light reception cells 18a overlap the central pupil image 17a adjacent in a horizontal direction and a vertical direction (up, down, left, and right directions) in a range of one light reception cell.

Since the imaging device 10 of the present invention may be able to capture a wide-angle image corresponding to the central optical system 13 and a telescopic image corresponding to the annular optical system 14 as described below, the central pupil image 17a and the annular pupil image 17b may not overlap each other. That is, even when the annular pupil images 17b adjacent to each other partially overlap each other on the image sensor 18, the images do not collapse.

Figure 5B:
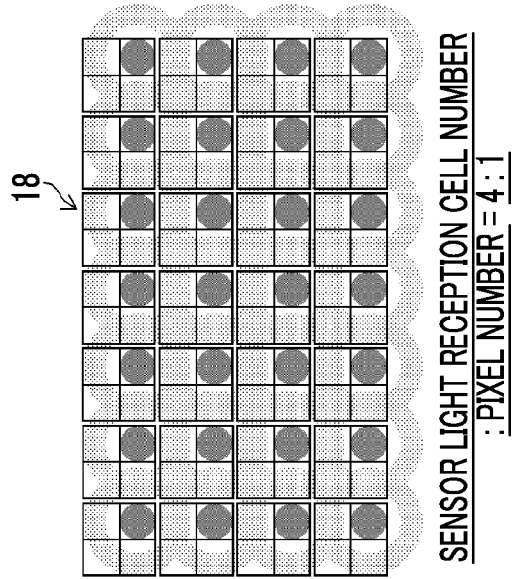
FIGS. 5A and 5B are views illustrating a case in which adjacent pupil images (annular pupil images) do not overlap each other on the image sensor and a case in which adjacent pupil images overlap each other.
Figure 5A:
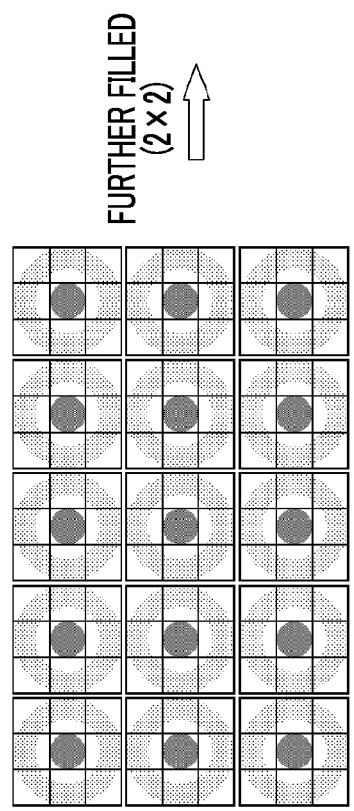

FIGS. 5A and 5B are diagrams illustrating a case in which adjacent pupil images (annular pupil images) do not overlap each other on the image sensor and a case in which adjacent pupil images overlap each other as in the first embodiment described above, respectively.

When the imaging optical system is concentrically divided into the central optical system and the annular optical system, the assignment number of light reception cells that can be assigned to each microarray lens of the array lens in a range in which the annular pupil images do not overlap each other on the image sensor as illustrated in FIG. 5A is limited to 3×3. However, according to the first embodiment of the present invention, when the number of light reception cells of the image sensor 18 (number of pixels) is M and each of the number of pixels of the wide-angle image and the number of pixels of the telescopic image obtained from the image sensor is N, a ratio of the pixel number M and the pixel number N is M:N=4:1, as illustrated in FIG. 5B.

Referring back to FIG. 2, the imaging device 10 includes the imaging optical system 12 having the central optical system 13 and the annular optical system 14 described with reference to FIG. 3, and the array lens 16 and the image sensor 18 of the first embodiment described with reference to FIG. 4. An operation of the entire device is generally controlled by a central processing unit (CPU) 40.

In the imaging device 10, an operation unit 38 such as the shutter button 38-1, a mode dial (mode switching device), a playback button, a MENU/OK key, a cross key, and a BACK key is provided. A signal from the operation unit 38 is input to the CPU 40, and the CPU 40 controls each circuit of the imaging device 10 based on the input signal and performs, for example, imaging operation control, image processing control, image data recording/reproducing control, or display control of a liquid crystal monitor (LCD) 30.

The shutter button 38-1 (FIG. 1) is an operation button that inputs an instruction to start imaging, and includes a two-step stroke switch including an S1 switch that is turned ON at the time of half pressing and an S2 switch that is turned ON at the time of full pressing.

The mode dial is selection means for switching to an auto imaging mode in which a still image is captured, a manual imaging mode, a scene position such as a portrait, a landscape, and a night scene, and a moving image mode in which a moving image is captured. Further, the mode dial functions as selection means for switching, at the time of the imaging mode, a first imaging mode in which a wide-angle image (first image) formed through the central optical system 13 is acquired, a second imaging mode in which a telescopic image (second image) formed through the annular optical system 14 is acquired, a hybrid imaging mode in which the wide-angle image and the telescopic image are simultaneously acquired, and the like.

The playback button is a button for switching to a playback mode in which a captured and recorded still or moving image is displayed on the liquid crystal monitor 30. The MENU/OK key is an operation key having both of a function of a menu button for performing an instruction to display a menu on a screen of the liquid crystal monitor 30, and a function of an OK button to instruct, for example, confirmation and execution of selected content. The cross key is an operation unit that inputs an indication of four directions including up, down, left and right, and functions as a button (cursor movement operation means) for selecting an item from the menu or instructing selection of various setting items of each menu. Further, an up/down key of the cross key functions as a zoom switch at the time of imaging or a playback zoom switch at the time of the playback mode, and a left/right key functions as a frame-by-frame feeding (forward/reverse feeding) button at the time of the playback mode. The BACK key is used, for example, to erase a desired target such as a selected item, cancel instruction content, or return to a directly previous operation state.

In the imaging mode, subject light is formed as an image on a light reception surface of the image sensor 18 via the imaging optical system 12 and the array lens 16.

A subject image formed on the light reception surface of each light reception cell (light reception element) of the image sensor 18 is converted to a signal voltage (or charge) having magnitude corresponding to an amount of incident light.

The signal voltage (or charge) accumulated in the image sensor 18 is accumulated in the light reception cell itself or a provided capacitor. The accumulated signal voltage (or charge) is read together with selection of a pixel position using a scheme of a MOS imaging device (a so-called CMOS sensor), which uses an X-Y address scheme, by a sensor control unit 32.

Accordingly, an image signal indicating the wide-angle image including a pixel group corresponding to the central optical system 13, and an image signal indicating the telescopic image including a pixel group corresponding to the annular optical system 14 can be read from the image sensor 18.

The image signal (voltage signal) read from the image sensor 18 is sampled and held for each pixel by a correlated double sampling process (a process of obtaining accurate pixel data by calculating a difference between a feed-through component level and a pixel signal component level included in an output signal of each pixel of the sensor for the purpose of reducing noise (particularly, thermal noise) or the like included in the sensor output signal), amplified, and then applied to the A/D converter 20. The A/D converter 20 converts sequentially input image signals to a digital signal and outputs the digital signal to an image input controller 22. Further, in a MOS type sensor, an A/D converter may be built. In this case, the digital signal is directly output from the image sensor 18.

By selecting the pixel position of the image sensor 18 and reading the pixel signal, it is possible to selectively read the image signal indicating the wide-angle image and the image signal indicating the telescopic image.

That is, the pixel signal of the light reception cell of the image sensor 18 on which the central pupil image 17a is incident is selectively read such that the image signal indicating the wide-angle image can be acquired, whereas the pixel signal of the light reception cell of the image sensor 18 on which the annular pupil image 17b is incident is selectively read, the pixel signals of the eight light reception cells on which the same annular pupil image 17b is incident are summed so as to generate a pixel signal of one pixel of the telescopic image, and this is performed on each annular pupil image 17b such that the image signal of the telescopic image can be acquired.

Further, all the pixel signals may be read from the image sensor 18 and temporarily stored in a memory (SDRAM) 48, and a digital signal processing unit (image generation unit) 24 may generate two image signals of the wide-angle image and the telescopic image as described above based on the pixel signals stored in the memory 48.

Further, the digital signal processing unit 24 performs predetermined signal processing such as offset processing or a gamma correction process on a digital image signal input via the image input controller 22. Further, when a color image signal of red (R), green (G), and blue (B) is acquired as an image signal of the wide-angle image and the telescopic image as described below, the digital signal processing unit 24 performs demosaic processing on the image signal of R, G, and B. Here, the demosaic processing is a process of calculating all color information for each pixel from an RGB mosaic image corresponding to a color filter array of a single-plate color imaging device and is also referred to as a synchronization process. For example, in the case of an imaging element including filters for three colors including RGB, the demosaic processing is a process of calculating color information of all R, G, and B for each pixel from the mosaic image including R, G, and B. Further, the digital signal processing unit 24 performs, for example, RGB/YC conversion to generate a luminance signal Y and color difference signals Cb and Cr from the image signals of R, G, and B subjected to the demosaic processing.

The image data processed by the digital signal processing unit 24 is input to a video random access memory (VRAM) 50. The image data read from the VRAM 50 is encoded by a video encoder 28 and output to the liquid crystal monitor 30 provided on a back surface of the camera. Accordingly, the subject image is displayed on the display screen of the liquid crystal monitor 30.

When there is pressing (half pressing) of a first step of the shutter button 38-1 of the operation unit 38, the CPU 40 starts an AE operation, and the image data output from the A/D converter 20 is input to an AE detection unit 44.

The AE detection unit 44 integrates the image signal of the entire screen or integrates an image signal differently weighted in a screen center portion and a surrounding portion, and outputs an integrated value to the CPU 40. The CPU 40 calculates brightness (imaging Ev value) of the subject from the integrated value input from the AE detection unit 44, determines an diaphragm value of an diaphragm (not illustrated) and an electronic shutter (shutter speed) of the image sensor 18 according to a predetermined program diagram based on the imaging Ev value, controls the diaphragm based on the determined diaphragm value, and controls a charge accumulation time of the image sensor 18 via the sensor control unit 32 based on the determined shutter speed.

When the AE operation ends and there is pressing (full pressing) of a second step of the shutter button 38-1, the image data output from the A/D converter 20 is input from the image input controller 22 to the memory (SDRAM: Synchronous Dynamic RAM) 48 in response to the pressing, and is temporarily stored in the memory 48. The image signal temporarily stored in the memory 48 is appropriately read by the digital signal processing unit 24, performed on predetermined signal processing by the digital signal processing unit 24, and stored in the memory 48 again.

The image signal stored in the memory 48 is output to a compression and expansion processing unit 26, subjected to a predetermined compression process such as Joint Photographic Experts Group (JPEG), and then, recorded in the memory card 54 via a media controller 52.

When the first imaging mode or the second imaging mode is selected by the mode dial, the wide-angle image or the telescopic image can be selectively acquired. When the hybrid imaging mode is selected by the mode dial, the wide-angle image and the telescopic image can be simultaneously acquired. Accordingly, it is possible to acquire the wide-angle image and the telescopic image without mechanical switching of the wide-angle optical system and the telescopic optical system or without a zooming operation of a zoom lens.

In the above embodiment, pixel signals of the eight light reception cells to which the same annular pupil image 17b is incident are summed so as to generate a pixel signal of one pixel of the telescopic image, but the present invention is not limited thereto. First, red (R), green (G), and blue (B) color filters on the respective light reception cells of the image sensor 18 are arranged as illustrated in FIG. 6. The digital signal processing unit 24 sums the pixel signals of the four light reception cells in which four G filters at four corners are arranged among the eight light reception cells on which the same annular pupil image 17b is incident to generate one G signal, sums the pixel signals of the two light reception cells in which two left and right R filters are arranged to generate one R signal, and sums the pixel signals of the two light reception cells in which the two upper and lower B filters are arranged to generate one B signal.

In other words, a pixel signal of one light reception cell in which a G filter is arranged is used to generate a G signal of four G pixels (four pixels around the light reception cell) of the telescopic image, a pixel signal of one light reception cell in which an R filter is arranged is used to generate an R signal of two R pixels (two left and right pixels between which the light reception cell is interposed) of the telescopic image, and a pixel signal of one light reception cell in which a B filter is arranged is used to generate a B signal of two B pixels (two upper and lower pixels between which the light reception cell is interposed) of the telescopic image.

Thus, it is possible to acquire R, G, and B signals (color image signals of the telescopic image) subjected to the synchronization process (demosaic processing).

Meanwhile, it is possible to acquire a color image signal of the wide-angle image by arranging color filters of a predetermined filter array (a Bayer array, a G stripe R/G full checkered, X-Trans (registered trademark) array, or the like) on each light reception cell on which the central pupil image 17a is incident. It is necessary to perform the demosaic processing on the RGB image signal of this wide-angle image using the digital signal processing unit 24.

Second Embodiment of Imaging Device According to the Present Invention

Next, a second embodiment of an imaging device according to the present invention will be described. Further, since this imaging device is different mainly in the imaging optical system and the array lens from the imaging device of the first embodiment, a difference will be hereinafter described.

First, an imaging optical system by which a central pupil image 117a and an annular pupil image 117b illustrated in FIG. 7B are obtained is used as the imaging optical system in place of the above-described imaging optical system 12 by which the central pupil image 17a and the annular pupil image 17b illustrated in FIG. 7A are obtained. The imaging optical system by which the central pupil image 117a and the annular pupil image 117b illustrated in FIG. 7B can be configured by shielding a portion of the annular optical system 14 in the imaging optical system 12 illustrated in FIG. 3.

That is, the annular optical system corresponding to the annular pupil image 117b can be configured by forming partial openings in only four sides including up, down, left, and right sides and shielding other portions. Accordingly, the partially lacking annular pupil image 117b is obtained.

Further, four optical systems having the same characteristics as the annular optical system may be arranged only in surrounding portions on the up, down, left, and right sides of the central optical system (positions corresponding to the partial openings of the annular optical system) instead of the partial opening and a light shielding portion being formed for the annular optical system.

Meanwhile, the respective microlenses of the array lens are assumed to be staggered with respect to the respective light reception cells 18a arranged in a square lattice form of the image sensor 18 as illustrated in FIG. 7C. Further, the pupil image formed on the image sensor by the respective microlenses of the array lens has an image size of 3×3.

Since this annular pupil image 117b lacks a portion overlapping with the adjacent central pupil image 117a, the central pupil image 117a and the annular pupil image 117b do not overlap on the image sensor 18.

Meanwhile, each microlens of the array lens can be densely arranged in a staggered manner, and the assignment number of light reception cells of the image sensor assigned to each microarray lens of the array lens can be smaller than that in the first embodiment. That is, when the number of pixels of the image sensor is M and each of the number of pixels of the wide-angle image and the number of pixels of the telescopic image obtained from the image sensor is N, a ratio of the pixel number M and the pixel number N is M:N=2:1.

Figure 8A:
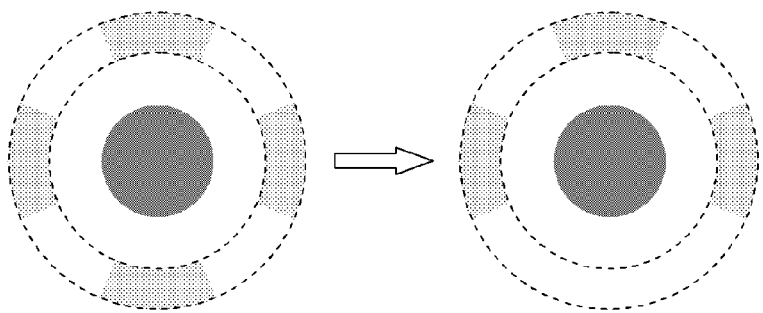
FIGS. 8A to 8C illustrate a modification example of a second embodiment of an imaging optical system (annular optical system).
Figure 8B:
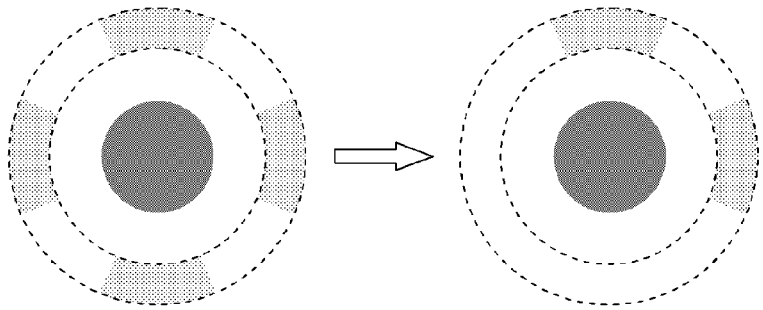
Figure 8C:
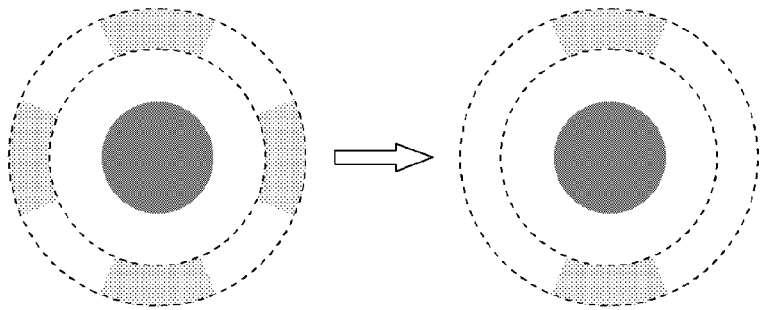

Modification Example of the Second Embodiment of Imaging Device According to the Present Invention FIGS. 8A to 8C are diagrams illustrating respective modification examples of the imaging optical system (annular optical system) of the second embodiment. Particularly, the annular optical systems are different in openings and light shielding portions from each other.

In the annular optical system illustrated in FIG. 8A, partial openings are formed on three sides including upper, right, and left sides, unlike the annular optical system (annular optical system in which the partial openings are formed on only four sides including upper, lower, left and right sides) of the second embodiment.

In the annular optical system illustrated in FIG. 8B, partial openings are formed on two sides including upper and right sides, and in the annular optical system illustrated in FIG. 8C, partial openings are formed on two sides including upper and lower sides.

In the case of the imaging optical system including the annular optical system illustrated in FIGS. 8A to 8C, each microlens of the array lens staggered with respect to each light reception cell of the image sensor can be used, similar to the second embodiment illustrated in FIG. 7C.

Figure 9:
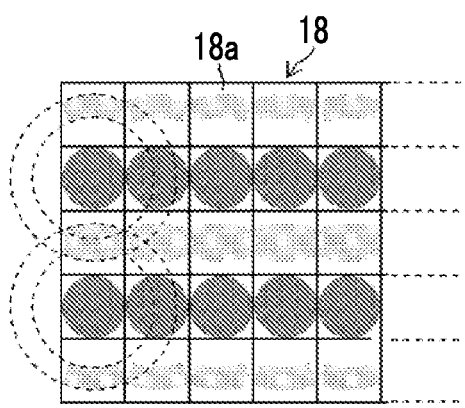
FIG. 9 is a view used to describe another array lens that can be applied to the imaging optical system including an annular optical system illustrated in FIG. 8C.

Further, in the case of an imaging optical system including the annular optical system illustrated in FIG. 8C, the microlens in a horizontal direction of the array lens is formed corresponding to each light reception cell 18a of the image sensor 18, and the microlens in a vertical direction is formed corresponding to every other light reception cell 18a, as illustrated in FIG. 9.

In the modification example of the second embodiment illustrated in FIGS. 8A to 8C, when the number of pixels of the image sensor is M and each of the number of pixels of the wide-angle image and the number of pixels of the telescopic image obtained from the image sensor is N, a ratio of the pixel number M and the pixel number N is M:N=2:1.

Third Embodiment of Imaging Device According to the Present Invention

Next, a third embodiment of an imaging device according to the present invention will be described. Further, since this imaging device is different mainly in the imaging optical system and the array lens from the imaging device of the first embodiment, the difference will be hereinafter described.

Figure 10:
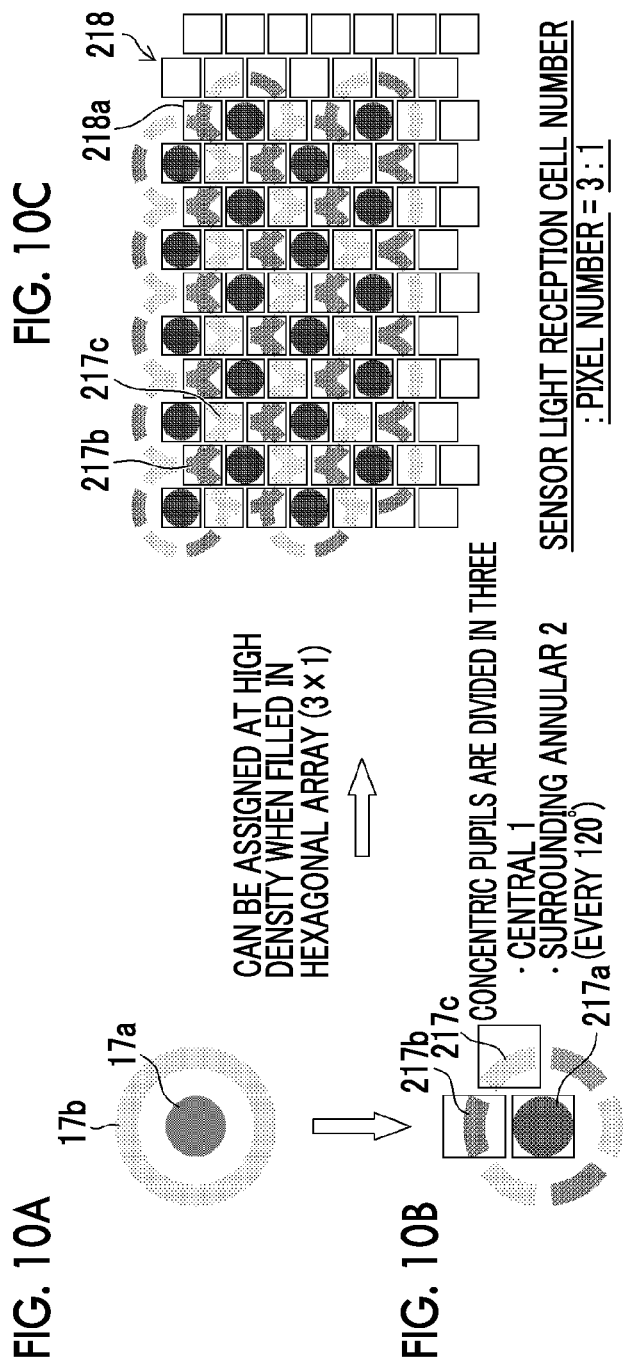
FIGS. 10A to 10C are views used to describe a second embodiment of the imaging device according to the present invention.

First, as the imaging optical system, an imaging optical system by which a central pupil image 217a and annular pupil images 217b and 217c illustrated in FIG. 10B are obtained is used in place of the imaging optical system 12 by which the central pupil image 17a and the annular pupil image 17b illustrated in FIG. 10A are obtained.

In this case, in the annular optical system in the imaging optical system including the central optical system and the annular optical system that are divided concentrically, partial openings are formed in six sides having directions different by 60° around the central optical system corresponding to the central pupil image 217a. Further, the annular optical system includes two optical systems (a third optical system and a fourth optical system) arranged in the openings corresponding to the annular pupil image 217b and the annular pupil image 217c at three sides at 120°.

In the third embodiment, the central optical system corresponding to the central pupil image 217a is a wide-angle optical system, and the third optical system and the fourth optical system corresponding to the annular pupil image 217b and the annular pupil image 217c are two types of telescopic optical systems having different focal length, respectively.

Further, in the image sensor 218, light reception cells 218a are arranged in a hexagonal lattice form, as illustrated in FIG. 10C.

Meanwhile, the respective microlenses of the array lens are staggered with respect to the respective light reception cells 218a arranged in a hexagonal lattice form in the image sensor 218, and arranged in every one in a horizontal direction, and arranged in every two in a vertical direction, as illustrated in FIG. 10C.

Each central pupil image 217a formed on the image sensor 218 by the microlens of the array lens is incident on one light reception cell corresponding to a center position of each microlens, and the annular pupil image 217b (first annular pupil image) and the annular pupil image 217c (second annular pupil image) are incident on six light reception cells (three light reception cells located in three directions at 120°×2) around the one light reception cell corresponding to the center position of each microlens.

While the annular pupil image 217b and the annular pupil image 217c overlap the adjacent annular pupil image 217b and the adjacent annular pupil image 217c on the image sensor 218 as illustrated in FIG. 10C, the annular pupil image 217b and the annular pupil image 217c do not overlap each other.

When the number of pixels of the image sensor 218 is M and each of the numbers of pixels of the wide-angle image and the two telescopic images having different focal lengths obtained from the image sensor 218 is N, a ratio of the pixel number M and the pixel number N is M:N=3:1.

Further, in the third embodiment, a third optical system and a fourth optical system corresponding to the annular pupil image 217b and the annular pupil image 217c are two types of telescopic optical systems having different focal lengths, but are not limited thereto and may be, for example, two telescopic optical systems having different imaging distance (focus position).

Second Embodiment of Imaging Optical System

Figure 11:
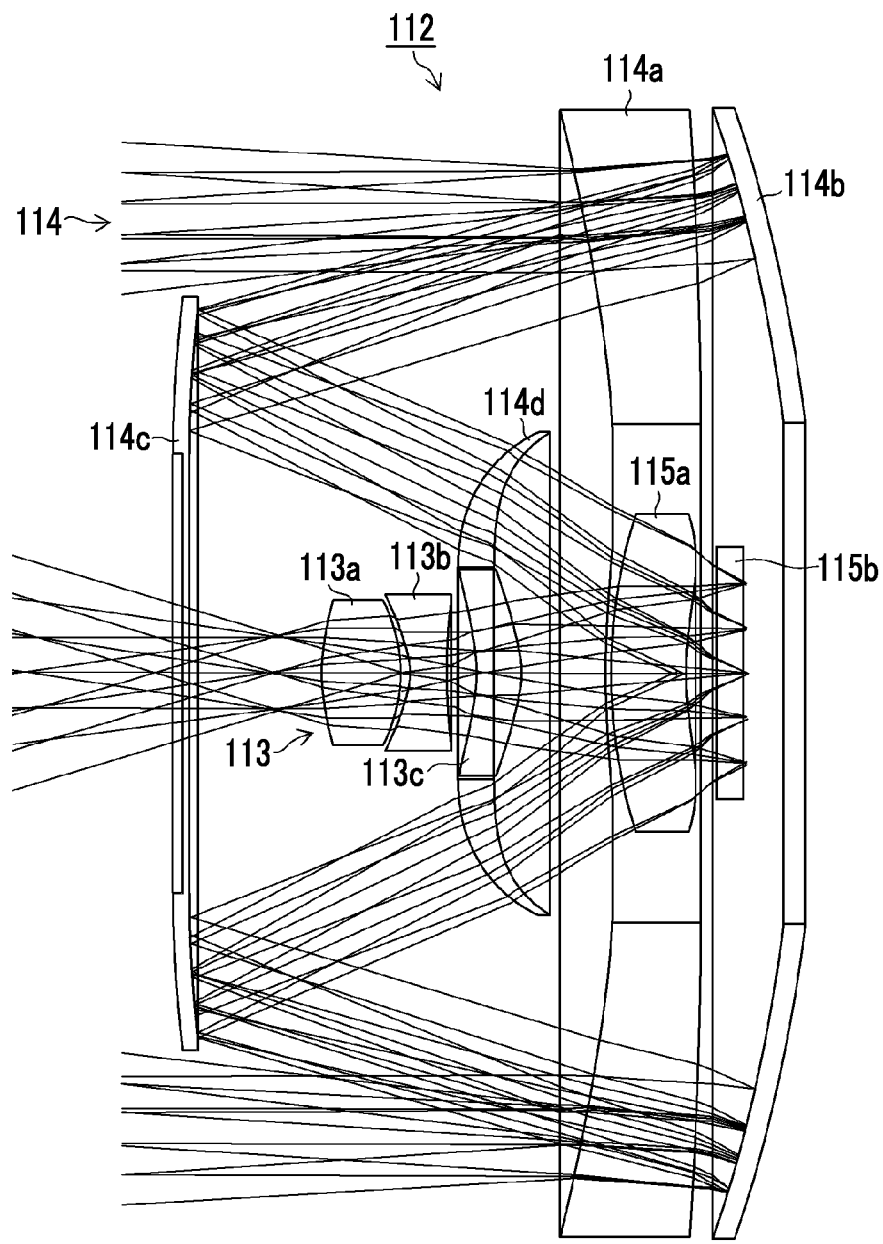
FIG. 11 is a sectional view illustrating a second embodiment of the imaging optical system that can be applied to the imaging device illustrated in FIG. 1.

FIG. 11 is a sectional view illustrating a second embodiment of the imaging optical system that can be applied to the imaging device 10.

This imaging optical system 112 includes a central optical system 113 in a central portion and an annular optical system 114 in a surrounding portion which are arranged on the same optical axis.

The central optical system 113 is a wide-angle optical system including a first lens 113a, a second lens 113b, a third lens 113c, a common lens 115a, and a cover glass 115b. Further, the cover glass 115b is arranged on a front surface of the array lens 16 (see FIG. 3).

The annular optical system 114 is a telescopic optical system including a first lens 114a, a first reflective mirror 114b, a second reflective mirror 114c, a second lens 114d, a common lens 115a, and a cover glass 115b. A light beam incident on the first lens 114a is reflected twice by the first reflective mirror 114b and the second reflective mirror 114c, and passes through the second lens 114d, the common lens 115a, and the cover glass 115b. By the light beam being folded back by the first reflective mirror 114b and the second reflective mirror 114c, a length in an optical axis direction of the telescopic optical system having a great focal length is shortened.

According to the imaging optical system 112 of the second embodiment, it is possible to arrange the array lens 16 and the image sensor 18 on an inner side (on object side relative to the first reflective mirror 114b) of the imaging optical system 112, and to reduce a dimension in an optical axis direction of the device.

Third Embodiment of Imaging Optical System

Figure 12:
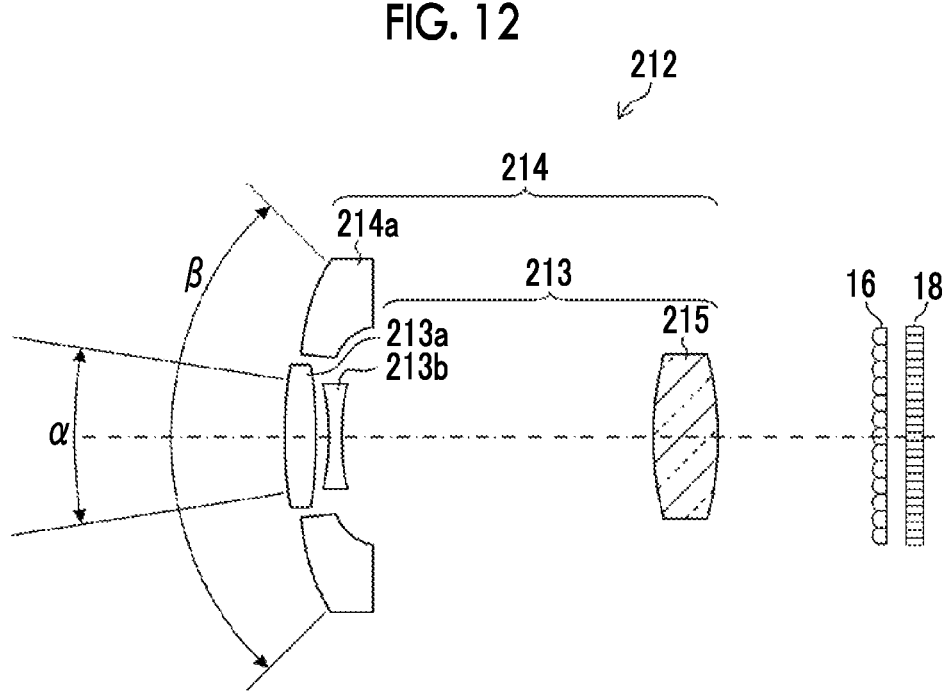
FIG. 12 is a sectional view illustrating a third embodiment of an imaging optical system that can be applied to the imaging device illustrated in FIG. 1.

FIG. 12 is a sectional view illustrating a third embodiment of the imaging optical system that can be applied to the imaging device 10.

This imaging optical system 212 includes a central optical system 213 in a central portion and an annular optical system 214 in a surrounding portion which are arranged on the same optical axis.

The central optical system 213 is a telescopic optical system including a first lens 213a, a second lens 213b, and a common lens 215, and has an angle of view α.

The annular optical system 214 is a wide-angle optical system including a lens 214a and a common lens 215, and has an angle of view β (β>α). The annular optical system 214 has a wider angle than the central optical system 213.

This imaging optical system 212 is different from the imaging optical system 12 illustrated in FIG. 3 in that the reflective mirror is not used, the central optical system 213 is a telescopic optical system, and the annular optical system 214 is a wide-angle optical system.

Other embodiments of the imaging device 10 may include, for example, a portable phone or a smartphone, a personal digital assistant (PDA), and a portable game machine that have a camera function. Hereinafter, an example in which the imaging device 10 is a smartphone will be described in detail with reference to the accompanying drawings.

<Configuration of Smartphone>

Figure 13:
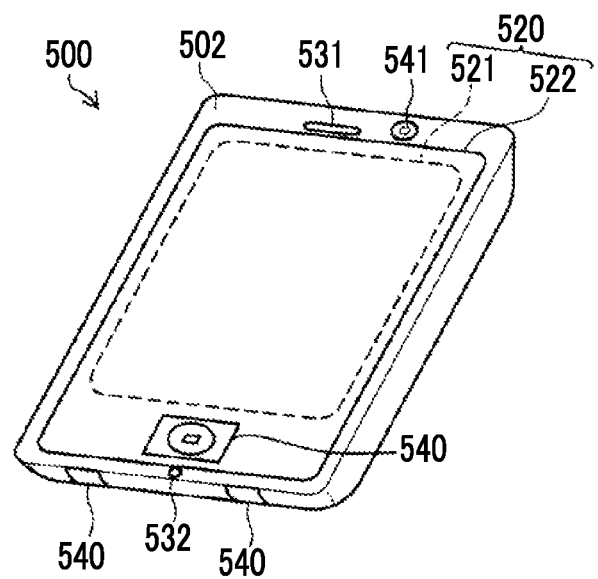
FIG. 13 is an appearance view of a smartphone according to another embodiment of the imaging device.

FIG. 13 illustrates an appearance of a smartphone 500 according to another embodiment of the imaging device 10. The smartphone 500 illustrated in FIG. 13 includes a plate-shaped casing 502, and includes a display and input unit 520 in which a display panel 521 which is a display unit and an operation panel 522 which is an input unit are integrated on one surface of the casing 502. Further, the casing 502 includes a speaker 531, a microphone 532, an operation unit 540, and a camera unit 541. Further, the configuration of the casing 502 is not limited thereto and, for example, the display unit and the input unit may adopt independent configurations or may adopt a configuration having a folding structure and a sliding structure.

Figure 14:
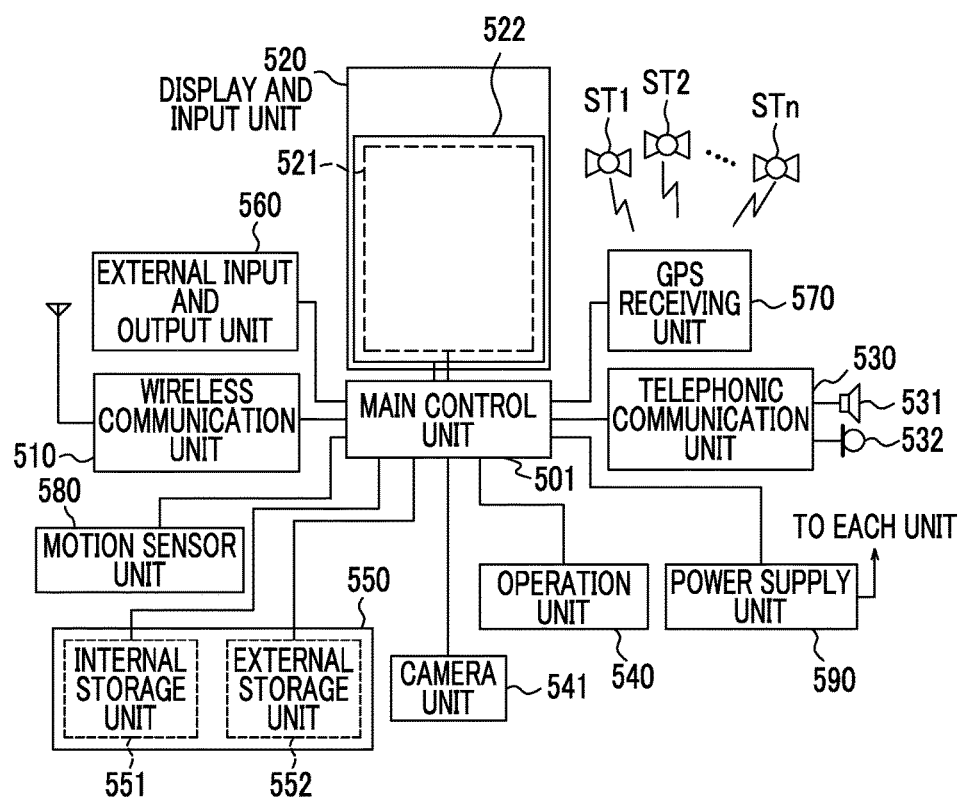
FIG. 14 is a block diagram illustrating a configuration of primary units of a smartphone.
Figure 15:
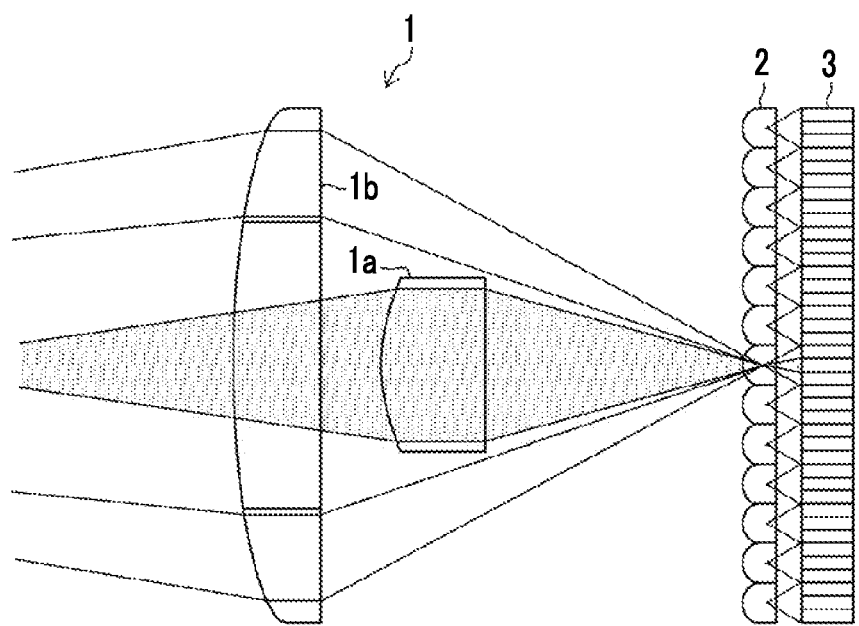
FIG. 15 is a diagram illustrating a conventional imaging device including an imaging optical system including a central optical system and an annular optical system, an array lens, and an image sensor.
Figure 16:
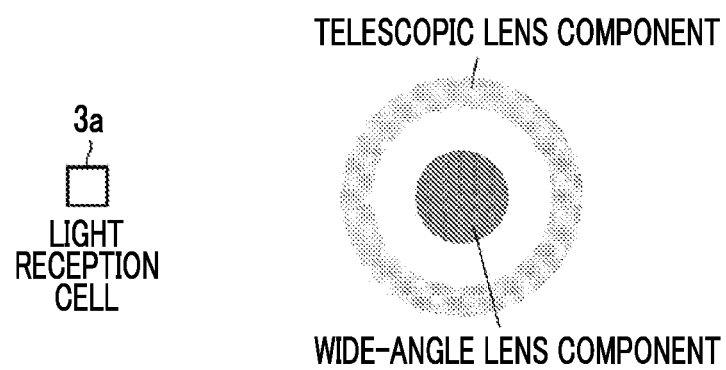
FIG. 16 is a diagram illustrating a relationship between one light reception cell and a pupil image.
Figure 18A:
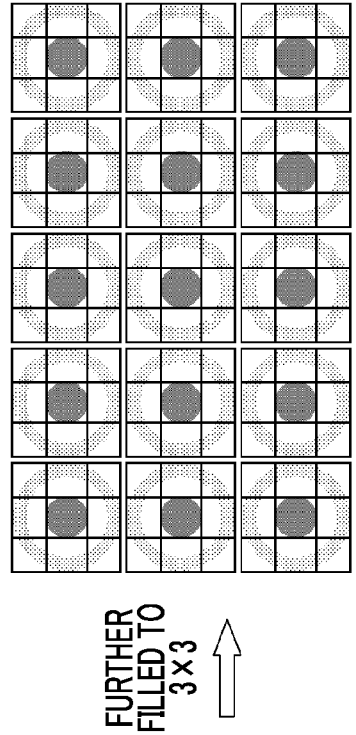
FIGS. 18A and 18B are diagrams illustrating another example of each pupil image formed on the conventional image sensor.
Figure 18B:
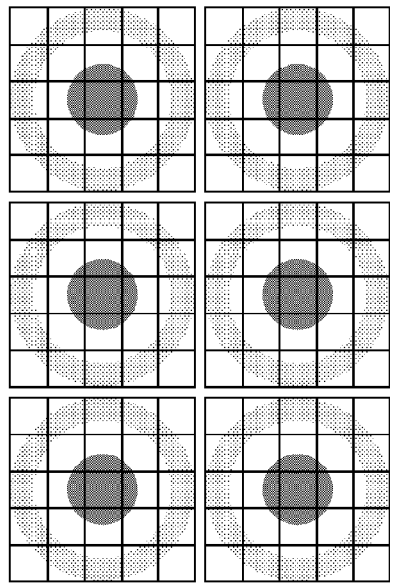

FIG. 14 is a block diagram illustrating a configuration of a smartphone 500 illustrated in FIG. 13. As illustrated in FIG. 14, main components of the smartphone include a wireless communication unit 510, a display and input unit 520, a telephonic communication unit 530, an operation unit 540, a camera unit 541, a storage unit 550, an external input and output unit 560, a global positioning system (GPS) reception unit 570, a motion sensor unit 580, a power supply unit 590, and a main control unit 501. Further, a main function of the smartphone 500 includes a wireless communication function of performing mobile wireless communication via a base station device BS and a mobile communication network NW.

The wireless communication unit 510 performs wireless communication with the base station device BS accommodated in the mobile communication network NW according to an instruction of the main control unit 501. Using this wireless communication, the wireless communication unit 510 performs transmission and reception of various file data such as voice data and image data, e-mail data, or the like, or reception of web data, streaming data, or the like.

The display and input unit 520 is a so-called touch panel that displays an image (a still image and a moving image), text information, or the like to visually deliver information to the user, and detects a user operation with respect to the displayed information, under control of the main control unit 501, and includes a display panel 521, and an operation panel 522. When a generated 3D image is viewed, it is preferable for the display panel 521 to be a 3D display panel.

The display panel 521 uses a liquid crystal display (LCD), an organic electro-luminescence display (OELD), or the like as a display device.

The operation panel 522 is a device that is placed such that an image displayed on a display surface of the display panel 521 is visible, and detects one or a plurality of coordinates operated by a finger of a user or a stylus. When this device is operated by the finger of the user or the stylus, a detection signal generated due to the operation is output to the main control unit 501. Then, the main control unit 501 detects an operation position (coordinates) on the display panel 521 based on the received detection signal.

The display panel 521 and the operation panel 522 of the smartphone 500 are formed integrally with each other to constitute the display and input unit 520 as illustrated in FIG. 13, but the operation panel 522 is arranged to completely cover the display panel 521. When this arrangement is adopted, the operation panel 522 may have a function of detecting a user operation in an area other than the display panel 521. In other words, the operation panel 522 may include a detection area (hereinafter referred to as a display area) for an overlapping portion overlapping the display panel 521, and another detection area (hereinafter referred to as a non-display area) for an outer edge portion not overlapping the display panel 521.

Further, a size of the display area may completely match a size of the display panel 521, but both do not necessarily have to match each other. Further, the operation panel 522 may include two sensitive areas including an outer edge portion and an inner portion other than the outer edge portion. Further, a width of the outer edge portion is appropriately designed according to a size of the casing 502. Furthermore, a position detection scheme employed in the operation panel 522 may include a matrix switch scheme, a resistance film scheme, a surface acoustic wave scheme, an infrared scheme, an electromagnetic induction scheme, a capacitive scheme, and the like, and any of the schemes may be adopted.

The telephonic communication unit 530 includes a speaker 531 or a microphone 532. The telephonic communication unit 530 converts user's voice input through the microphone 532 into audio data that can be processed by the main control unit 501 and outputs the audio data to the main control unit 501 or decodes audio data received by the wireless communication unit 510 or the external input and output unit 560 and outputs the resultant audio data from the speaker 531. Further, as illustrated in FIG. 13, for example, the speaker 531 can be mounted on the same surface as the surface on which the display and input unit 520 is provided, and the microphone 532 can be mounted on a side surface of the casing 502.

The operation unit 540 includes hardware keys using key switches or the like, and receives an instruction from the user. For example, the operation unit 540 is mounted on a lower surface under the display unit of the casing 502 of the smartphone 500, and is a push button type of switches which are turned on when pressed with a finger and turned off due to restoring force of a spring or the like when the finger is separated.

The storage unit 550 stores a control program or control data of the main control unit 501, address data associated with a name or a telephone number of a communication party, data of a transmitted or received e-mail, web data downloaded by Web browsing, and downloaded content data, and temporarily stores streaming data or the like. Further, the storage unit 550 includes an internal storage unit 551 built in a smartphone, and an external storage unit 552 having a freely removable external memory slot. Further, each of the internal storage unit 551 and the external storage unit 552 constituting the storage unit 550 is implemented using a storage medium such as a flash memory type, hard disk type, multimedia card micro type, or card type memory (for example, micro SD (registered trademark) memory), a random access memory (RAM), or a read only memory (ROM).

The external input and output unit 560 serves as an interface with all external devices connected to the smartphone 500, and is intended for direct or indirect connection to another external device through communication or the like (for example, Universal Serial Bus (USB) or IEEE1394) or a network (for example, the Internet, a wireless LAN, Bluetooth®, RFID (Radio Frequency Identification), infrared communication (Infrared Data Association: IrDA)®, UWB (Ultra Wideband)®, Zigbee®).

Examples of the external device connected to the smartphone 500 include a wired/wireless headset, a wired/wireless external charger, a wired/wireless data port, a memory card connected via a card socket, an SIM (Subscriber Identity Module Card)/UIM (User Identity Module Card) card, an external audio and video device connected via audio and video I/O (Input/Output) terminals, a wirelessly connected external audio-video device, wiredly/wirelessly connected smartphone, a wiredly/wirelessly connected personal computer, a wiredly/wirelessly connected PDA, and an earphone. The external input and output unit can transfer data received from such an external device to each component inside the smartphone 500 or can transfer internal data of the smartphone 500 to the external device.

According to an instruction of the main control unit 501, the GPS reception unit 570 receives GPS signals transmitted from GPS satellites ST1 to STn and executes a positioning calculation process based on a plurality of received GPS signals to detect a position including a latitude, a longitude, and an altitude of the smartphone 500. When the GPS reception unit 570 can acquire position information from the wireless communication unit 510 or the external input and output unit 560 (for example, wireless LAN), the GPS reception unit 570 can also detect the position using the position information.

The motion sensor unit 580 includes, for example, a three-axis acceleration sensor. According to an instruction of the main control unit 501, the motion sensor unit 580 detects a physical motion of the smartphone 500. By detecting the physical motion of the smartphone 500, a direction and an acceleration of movement of the smartphone 500 are detected. A result of this detection is output to the main control unit 501.

The power supply unit 590 supplies power accumulated in a battery (not illustrated) to each unit of the smartphone 500 according to the instruction of the main control unit 501.

The main control unit 501 includes a microprocessor. The main control unit 501 operates according to the control program or the control data stored in the storage unit 550, and generally controls the respective units of the smartphone 500. Further, the main control unit 501 has a mobile communication control function of controlling each unit of a communication system and an application processing function in order to perform voice communication or data communication via the wireless communication unit 510.

The application processing function is realized by the main control unit 501 operating according to application software stored in the storage unit 550. Examples of the application processing function includes an infrared communication function of controlling the external input and output unit 560 and performing communication with a party device, an e-mail function of performing transmission and reception of an e-mail, and a web browsing function of browsing web pages.

Further, the main control unit 501 has an image processing function of, for example, displaying an image on the display and input unit 520 based on image data (data of a still image or a moving image) such as received data or downloaded streaming data. The image processing function refers to a function by which the main control unit 501 decodes the image data, performs image processing on a result of the decoding, and displays an image on the display and input unit 520.

Further, the main control unit 501 executes display control for the display panel 521, and operation detection control for detecting a user operation through the operation unit 540 and the operation panel 522.

Through execution of the display control, the main control unit 501 displays an icon for starting up the application software or a software key such as a scroll bar, or displays a window for creating the e-mail. Further, the scroll bar refers to a software key for receiving an instruction to move a display portion of the image for a large image that cannot be accommodated in the display area of the display panel 521.

Further, through execution of the operation detection control, the main control unit 501 detects a user operation through the operation unit 540, receives an operation of the icon or an input of a character string to an input field of the window through the operation panel 522, or receives a request for scroll of a displayed image through the scroll bar.

Moreover, through execution of the operation detection control, the main control unit 501 has a touch panel control function of determining whether the operation position with respect to the operation panel 522 is an overlapping portion (display area) overlapping the display panel 521 or the outer edge portion (non-display area) not overlapping the display panel 521, other than the overlapping portion, and controlling the sensitive area of the operation panel 522 or a display position of the software key.

Further, the main control unit 501 may detect a gesture operation with respect to the operation panel 522, and execute a preset function according to the detected gesture operation. The gesture operation is not a conventional simple touch operation, but refers to an operation of drawing a locus for at least one of a plurality of positions by drawing a locus using a finger or the like, simultaneously designating a plurality of positions, or combining them.

The camera unit 541 is a digital camera that performs electronic imaging using an imaging element such as a complementary metal oxide semiconductor (CMOS) or a charge coupled device (CCD). The imaging device 10 described above can be applied to this camera unit 541. The camera unit 541 can capture the wide-angle image and the telescopic image without requiring mechanical switching mechanism or the like, and is suitable as a camera unit incorporated in a thin portable terminal such as the smartphone 500.

Further, the camera unit 541 can convert image data obtained by imaging into, for example, compressed image data such as a joint photographic coding experts group (JPEG) under control of the main control unit 501, and record the compressed image data in the storage unit 550 or output the compressed image data via the external input and output unit 560 or the wireless communication unit 510. In the smartphone 500 illustrated in FIG. 13, the camera unit 541 is mounted on the same surface as the display and input unit 520, but a mounting position of the camera unit 541 is not limited thereto, and the camera unit 541 may be mounted on a back surface of the display and input unit 520 or a plurality of camera units 541 may be mounted. Further, when the plurality of camera units 541 are mounted, imaging can be performed using one switched camera unit 541 provided for imaging, or imaging can be performed simultaneously using the plurality of camera units 541.

Further, the camera unit 541 can be used for various functions of the smartphone 500. For example, it is possible to display the image acquired by the camera unit 541 on the display panel 521 or use the image of the camera unit 541 as one of operation inputs of the operation panel 522. Further, when the GPS reception unit 570 detects the position, it is possible to detect the position by referring to the image from the camera unit 541. Further, it is possible to determine an optical axis direction of the camera unit 541 of the smartphone 500 or determine a current usage environment without using a 3-axis acceleration sensor or in combination with the 3-axis acceleration sensor by referring to the image from the camera unit 541. Of course, it is also possible to use the image from the camera unit 541 within application software.

[Others]

The reflective mirror in a reflective mirror type of lens configuration of the imaging optical system 12 illustrated in FIG. 3 is not limited to a concave mirror or a convex mirror, and may be a plane mirror. The number of reflective mirrors is not limited to two, three or more reflective mirrors may be provided.

Further, one of the central optical system and the annular optical system in the imaging optical system of the present embodiment is a wide-angle optical system, and the other is a telescopic optical system, but the present invention is not limited thereto. For example, application of various optical systems such as two types of optical systems having different focal lengths, two types of optical systems having different spatial frequency characteristics (blur) is considered.

Further, a moving mechanism that moves the common lens of the central optical system and the annular optical system or the image sensor in the optical axis direction may be provided so as to perform focus adjustment.

Further, it is understood that the present invention is not limited to the above-described embodiments, and various modifications can be made without departing from the spirit of the present invention.

EXPLANATION OF REFERENCES

10: imaging device
12, 112, 212: imaging optical system
13, 113, 213: central optical system
14, 114, 214: annular optical system
16: array lens
16a: microlens
18: image sensor
18a: light reception cell
24: digital signal processing unit
40: central processing unit (CPU)

What is claimed is:

1. An imaging device, comprising:
    an imaging optical system including a first optical system, and a second optical system arranged on a same optical axis, wherein the second optical system is provided around the first optical system and having different characteristics from the first optical system;
    an image sensor including a plurality of two-dimensionally arranged light reception elements; and
    an array lens including a two-dimensionally arranged microlenses, the array lens being arranged on the incidence surface side of the image sensor and forming pupil images of the imaging optical system on the image sensor using the respective microlens,
    wherein the array lens causes second pupil images corresponding to the second optical systems adjacent to each other among the respective pupil images formed on the image sensor by the respective microlenses to partially overlap each other on the image sensor, thereby increasing a number of pixels of images having different characteristics that are captured simultaneously.

2. The imaging device according to claim 1, further comprising:
    an image generation unit that reads a first pupil image corresponding to the first optical system and a second pupil image corresponding to the second optical system from the image sensor, and generates a first image including the first pupil image and a second image including the second pupil image.

3. The imaging device according to claim 2,
    wherein the first optical system of the imaging optical system is a circular central optical system, and the second optical system is an annular optical system arranged concentrically with respect to the circular central optical system, and
    the array lens causes the annular pupil images corresponding to the annular optical system adjacent to each other among the respective pupil images formed on the image sensor by the respective microlenses to partially overlap each other on the image sensor.

4. The imaging device according to claim 3,
    wherein the respective pupil images formed on the image sensor by the respective microlenses of the array lens have an image size of 3×3 pixels,
    a central pupil image corresponding to the circular central optical system is incident on the light reception element corresponding to a center pixel among the 3×3 pixels,
    an annular pupil image corresponding to the annular optical system is incident on the light reception elements corresponding to eight pixels around the center pixel among the 3×3 pixels, and when the number of pixels in the image sensor is M and each of the numbers of pixels of a first image including the central pupil image and a second image including the annular pupil image is N, a ratio of the pixel number M and the pixel number N is M:N=4:1.

5. The imaging device according to claim 2, wherein the first optical system of the imaging optical system is a circular central optical system, and the second optical system is an annular optical system arranged concentrically with respect to the circular central optical system, the array lens causes the annular pupil images corresponding to the annular optical system adjacent to each other among the respective pupil images formed on the image sensor by the respective microlenses to partially overlap each other on the image sensor, and causes the central pupil image corresponding to the circular central optical system and a portion of the annular pupil image corresponding to the annular optical system that are adjacent to each other to overlap each other, and the annular optical system is formed such that a part corresponding to a portion of the annular pupil image overlapping the central pupil image corresponding to the circular central optical system is shielded or a part corresponding to a portion of the annular pupil image overlapping the central pupil image corresponding to the circular central optical system lacks.

6. The imaging device according to claim 5, wherein the respective pupil images formed on the image sensor by the respective microlenses of the array lens have an image size of 3×3 pixels, a central pupil image corresponding to the circular central optical system is incident on the light reception element corresponding to a center pixel among the 3×3 pixels, and an annular pupil image corresponding to the annular optical system is incident on the light reception elements corresponding to eight pixels around the center pixel among the 3×3 pixels, and when the number of pixels in the image sensor is M and each of the numbers of pixels of a first image including the central pupil image and a second image including the annular pupil image is N, a ratio of the pixel number M and the pixel number N is M:N=2:1.

7. The imaging device according to claim 1, wherein one of the first optical system and the second optical system in the imaging optical system is a wide-angle optical system, and the other is a telescopic optical system, which has a greater focal length than the wide-angle optical system.

8. The imaging device according to claim 1, wherein the first optical system of the imaging optical system is a circular central optical system, and the second optical system is an annular optical system arranged concentrically with respect to the circular central optical system, and the circular central optical system has a wider angle than the annular optical system.

9. The imaging device according to claim 2, wherein the first optical system of the imaging optical system is a circular central optical system, and the second optical system is an annular optical system arranged concentrically with respect to the circular central optical system, a third optical system and a fourth optical system having different characteristics being alternately arranged on the same optical axis, and the array lens causes first annular pupil images corresponding to the third optical systems of the annular optical system adjacent to each other among the respective pupil images formed on the image sensor by the respective microlenses to overlap each other on the image sensor, and causes second annular pupil images corresponding to the fourth optical systems of the annular optical system that are adjacent to each other to overlap each other on the image sensor.

10. The imaging device according to claim 9, wherein the plurality of light reception elements in the image sensor are arranged in a hexagonal lattice form, the respective pupil images formed on the image sensor by the respective microlenses of the array lens have an image size of seven pixels including a central pixel and six pixels around the central pixel, a central pupil image corresponding to the circular central optical system is incident on the light reception element corresponding to the center pixel among the seven pixels, a first annular pupil image corresponding to the third optical system of the annular optical system is incident on the light reception elements corresponding to three pixels in three directions at 120° from the central pixel among the six pixels around the central pixel, and a second annular pupil image corresponding to the fourth optical system of the annular optical system is incident on the light reception elements corresponding to three other pixels in three directions at 120° from the central pixel among the six pixels around the central pixel, and when the number of pixels in the image sensor is M and each of the numbers of pixels of a first image including the central pupil image, a second image including the first annular pupil image, and a third image including the second annular pupil image is N, a ratio of the pixel number M and the pixel number N is M:N=3:1.

11. The imaging device according to claim 9, wherein the circular central optical system of the imaging optical system is a wide-angle optical system, and the third optical system and the fourth optical system of the annular optical system are telescopic optical systems having different focal lengths.

12. The imaging device according to claim 9, wherein the circular central optical system of the imaging optical system is a wide-angle optical system, and the third optical system and the fourth optical system of the annular optical system are telescopic optical systems having different imaging distances.

13. The imaging device according to claim 12, wherein the annular optical system includes a reflective optical system that reflects a light beam twice or more.

14. The imaging device according to claim 13, wherein the image sensor is located on the object side relative to the reflective optical system that initially reflects a light beam.

15. The imaging device according to claim 12, wherein the circular central optical system and the annular optical system use a portion of the optical system in common.

* * * * *